F. O. JAQUES, Sr.
MICROMETER CALIPER.
APPLICATION FILED JAN. 20, 1920.
1,349,612.
Patented Aug. 17, 1920.
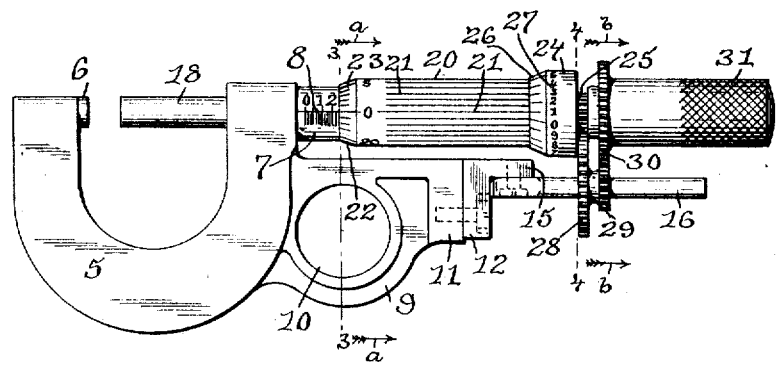
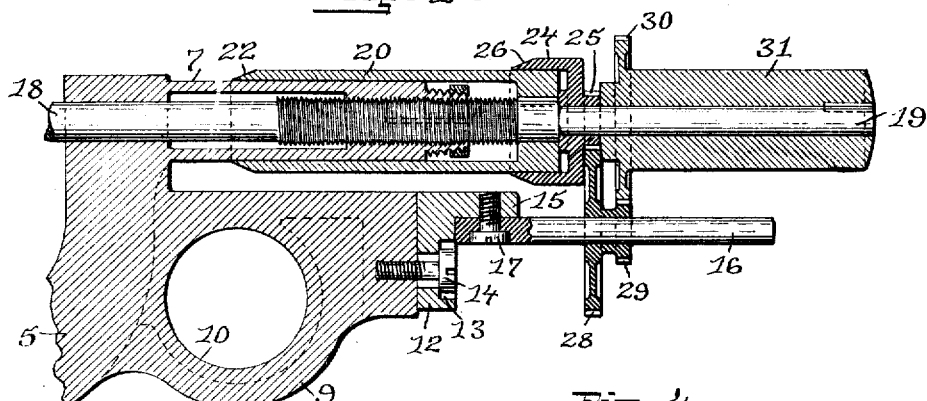
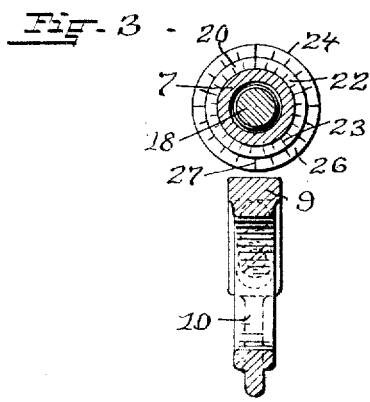
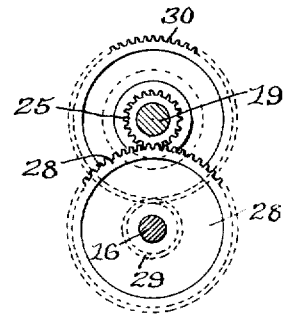
INVENTOR:
Fernando Oscar Jaques, Sr.,
By Chas. H. Luther
ATTORNEY.

UNITED STATES PATENT OFFICE.

FERNANDO OSCAR JAQUES, SR., OF PROVIDENCE, RHODE ISLAND, ASSIGNOR TO FERNANDO OSCAR JAQUES, JR., OF PROVIDENCE, RHODE ISLAND.

MICROMETER-CALIPER.

1,349,612.  Specification of Letters Patent.  Patented Aug. 17, 1920.

Application filed January 20, 1920. Serial No. 352,718.

*To all whom it may concern:*

Be it known that I, FERNANDO OSCAR JAQUES, Sr., residing at Providence, in the county of Providence and State of Rhode Island, have invented a new and useful Improvement in Micrometer-Calipers, of which the following is a specification.

The so called standard form of a micrometer caliper has a scale reading by one-thousandths of an inch up to a predetermined limit, usually one inch. Therefore the standard form of micrometer calipers in general use, do not easily give a finer accurate reading of less than one-thousandths of an inch. On extremely fine work it is necessary to caliper or gage the work by the use of a micrometer reading to much less than one-thousandths of an inch.

The object of my invention is to improve the construction of a micrometer caliper whereby the same is provided with two sets of scales each consisting of lines and numerals for indicating units of measurement, one set indicating units of measurement by one-thousandth of an inch and the other set indicating units of measurement by preferably one ten-thousandths of an inch or one twenty-thousandths of an inch or less according to the number of lines that can be easily and accurately seen on the scale.

My invention consists in the peculiar and novel construction of a micrometer caliper, constructed to read by lines and numerals to materially less than one-thousandths of an inch, said micrometer caliper having a thimble on which are lines and numerals reading by one-thousandths of an inch, a second thimble on which are lines and numerals which by dividing one-thousandths of an inch into as many parts as desired, preferably into ten or twenty parts, will give a reading by one ten- or one twenty-thousandths of an inch or less, means for synchronously operating the thimbles at the ratio desired, and details of construction, as will be more fully set forth hereinafter and claimed.

Figure 1 is a side view of a micrometer caliper provided with my invention.

Fig. 2 is an enlarged sectional view taken longitudinally through the operating mechanism of the caliper and showing the caliper handle broken away.

Fig. 3 is an enlarged transverse sectional view through the caliper, taken on line 3, 3 of Fig. 1, looking in the direction of the arrows *a, a,* and Fig. 4 is an enlarged transverse sectional view through the caliper, taken on line 4, 4 of Fig. 1, looking in the direction of the arrows *b, b.*

In the drawing, 5 indicates a U shaped handle, 6 an anvil, 7 a barrel on which are the lines and numerals 8. The handle 5 has an extension 9 constructed to have a finger-hold 10 and an end 11. The inner edge of the extension 9 is parallel with the barrel 7 and the end 11 is at right angles to the barrel, as shown in Fig. 1. An adjusting member 12 having a screw-head slot 13 is adjustably secured to the end 11 of the extension 9 by a screw 14 through the slot 13. The adjusting member 12 has an arm 15 to which a round rod 16 is pivotally secured by a screw 17 through the inner end of the rod into the arm 15, as shown in Fig. 2. A spindle 18 extends through the handle 5 and barrel 7 in alinement with the anvil 6, and is in screw-threaded engagement with the barrel 7, the outer end portion 19 of the spindle being slightly reduced in size. A thimble 20 is fixed at its outer end to the spindle 18 with which it turns. The thimble 20 has longitudinal indicating lines 21, 21 and a beveled inner end 22 on which are the lines and numerals 23, which in connection with the lines and numerals 8 on the barrel 7 indicates measurements by one-thousandths of an inch. A second thimble 24 over the thimble 20 is rotatably supported on the spindle 18 at the outer end of the thimble 20 and has a pinion 25 and an inner beveled end 26 on which are the lines and numerals 27 which in connection with the indicating lines 21, 21 on the thimble 20 divide one-thousandths of an inch into a predetermined number of parts. An integral gear 28 and pinion 29 has a rotating and reciprocal support on the rod 16 with the gear 28 meshing with the pinion 25 on the second thimble 24. The pinion 29 meshes with a gear 30 fixed to a knurled operating member 31 which in turn is fixed to the reduced outer end portion 19 of the spindle 18, as shown in Figs. 1 and 2.

The gearing is adjusted to eliminate play by adjusting the adjusting member 12 on the end 11 of the extension 9 and the indicating lines 27 on the second thimble 24 may be alined with the indicating lines 21, 21 on the thimble 20 by adjusting the rod 16 sidewise on the arm 15 of the adjusting member 12, both of which requires only very slight adjustments.

As shown in Fig. 3 the thimble has the usual 25 lines on its beveled end each of which indicates a thousandths part of an inch and the longitudinal indicating lines 21, 21 as shown in Fig. 1, and the second thimble 24 is shown to have on its beveled end 20 lines each of which indicates a twenty-thousandths part of an inch, if the ratio of the gearing is such as to revolve the second thimble 24 one revolution for one-twenty-fifth of a revolution of the thimble 20. With this ratio of the gearing the reading of the caliper as shown in Fig. 1, would be two-hundred and fifty thousandths and one twenty thousandths part of an inch, or one quarter and one twenty thousandths part of an inch. The caliper is operated by turning the operating member 31, in either direction and the ratio of the gearing may be such as to give as fine a reading as may be desired.

Having thus described my invention I claim as new:

1. A micrometer caliper having a handle, a barrel on the handle, provided with graduations for indicating units of measurement, a spindle screw-threaded through the barrel, a thimble fixed to the spindle, and means on the thimble for indicating division of units of measurement, a second thimble sleeved on to the first thimble, and means on the second thimble for indicating sub-divisions of units of measurement, means for rotatably supporting the second thimble and means for rotating the second thimble coincidently with and at a greater speed than the first thimble.

2. A micrometer caliper having a handle, a barrel on the handle, provided with graduations for indicating units of measurement, a spindle screw-threaded through the barrel, a thimble fixed to the spindle and having means for indicating divisions of units of measurement, a second thimble rotatably supported on the spindle and having means for indicating sub-divisions of units of measurement, and means for rotating the second thimble coincidently with and at a greater speed than the first thimble.

3. A micrometer caliper having a handle, a barrel on the handle, provided with graduations for indicating units of measurement, a spindle screw-threaded through the barrel, a thimble fixed to the spindle and having means for indicating divisions of units of measurement, a second thimble rotatably supported over the first thimble and having means for indicating sub-divisions of units of measurement, means for rotatably supporting the second thimble, and means for rotating the second thimble coincidently with and at a greater speed than the first thimble.

4. A micrometer caliper having a handle, a barrel on the handle and provided with graduations for indicating units of measurement, a spindle screw-threaded through the barrel, a thimble fixed to the spindle and having means for indicating divisions of units of measurements, a second thimble rotatably supported on the spindle and having means for indicating sub-divisions of units of measurements, an operating member fixed to the spindle, and means for operatively connecting the operating member with the second thimble whereby the second thimble is operated coincidently with and at a greater speed than the first thimble.

5. A micrometer caliper having a handle, a barrel on the handle and provided with graduations for indicating units of measurement, a spindle screw-threaded through the barrel, a thimble fixed to the spindle and having means for indicating divisions of units of measurements, a second thimble rotatably supported on the spindle and having a pinion and means for indicating sub-divisions of units of measurements, an operating member fixed to the spindle and having a gear, a rod adjustably secured to the handle, an integral gear and pinion rotatably and reciprocally supported on the rod, the gear meshing with the pinion on the second thimble and the pinion meshing with the gear on the operating member, whereby the second thimble is operated coincidently with and at a greater speed than the first thimble.

6. A micrometer caliper having a handle, a barrel on the handle and provided with graduations for indicating units of measurement, a spindle screw-threaded through the barrel, a thimble fixed to the spindle and having lines and numerals on its end and longitudinal lines indicating divisions of units of measurement, a second thimble rotatably supported on the spindle and having a pinion and lines and numerals indicating sub-divisions of units of measurement, an operating member fixed to the spindle, and having a gear, an adjusting member adjustably secured to the handle, a rod pivotally secured to the adjusting member, an integral gear and pinion rotatably and reciprocally supported on the rod, the gear meshing with the pinion on the second thimble and the pinion meshing with the gear on the operating member, and means for holding the gears and pinions in mesh, whereby the second thimble is operated coincidently with and at a greater speed than the first thimble and the operating parts may be adjusted for accuracy.

In testimony whereof, I have signed my name to this specification.

FERNANDO OSCAR JAQUES, Sr.